Patented Mar. 13, 1923.

1,448,251

UNITED STATES PATENT OFFICE.

MARCEL BADER AND CHARLES SUNDER, OF ALSATIA, FRANCE, ASSIGNORS OF ONE-HALF TO DURAND & HUGUENIN, S. A., OF BASEL, SWITZERLAND, A FIRM.

PRODUCT FOR DYEING AND PRINTING TEXTILE MATERIALS AND IN GENERAL FOR PIGMENTATION OF VARIOUS SUBSTRATA AND PROCESS FOR THE MANUFACTURE OF THE SAME.

No Drawing. Application filed August 8, 1922. Serial No. 580,544.

*To all whom it may concern:*

Be it known that we, MARCEL BADER and CHARLES SUNDER, both citizens of the French Republic, and residents of Mulhouse, Alsatia, France, have invented new and useful products for dyeing and printing textile materials and in general for pigmentation of various substrata and processes for the manufacture of the same, of which the following is a full, clear, and exact specification.

For dyeing purposes, the vat dyestuffs, which as such are insoluble in water, are generally reduced in alkaline solution and thus converted into products soluble in water. From the aqueous alkaline solution, the leucobodies are caused to dye the fibres and to be fixed thereon by oxidation, such as oxidation on the air.

This process has given good results in dyeing operations, but it is not so easily practicable in printing with vat dyestuffs. In this case, some difficulties arise, thus when preparing the thickened vat dyes, as well as also when steaming and developing the same. The alkali contents of the printing paste are in many respects harmful. The simultaneous printing of vat dyestuffs with dyestuffs of other classes is not easily possible.

Now, we have found certain new valuable derivatives of vat dyestuffs, soluble in water, which can be employed with the greatest advantage in dyeing and printing operations. These bodies are obtained by esterifying the leuco vat dyestuffs in such a manner that this esterification is effected (probably in the phenolhydroxyl) by means of a polybasic acid and that among the acid groups thereof one does not participate in the esterification, but remains free and is able to form salts and renders the product soluble in water. Thus, we may cause chlorosulfonic acid to react, according to a well known method, on leuco vat dyestuffs in presence of a tertiary base with or without the use of an indifferent diluting agent.

The new compounds are stable, especially in the air. By an oxidative splitting off, it is easily possible to reconstitute therefrom the insoluble parent dyestuff.

Their application consists in that the fibres to be dyed are impregnated entirely or in places with an aqueous solution of such a dyestuff derivative and that by the action of a gentle oxidizing agent, such as for instance a solution of ferric chloride, of an acidulated bichromate, of chloride of lime, etc., the dyeing is rapidly and fully developed.

The dyeings and printings obtained in such a simple manner show the same valuable properties of fastness as those obtained in the usual manner by the corresponding vat dyestuffs. However, the distribution of the coloring matter within the fibre is a better one than in the usual vat dyeing process. Another advantage of the new products consists in the fact that the fibres, particularly the animal fibres, are not injured by the said treatment in cold, neutral or weakly acid solution, a result which is not always attained with the ordinary vat dyeing process.

Inasmuch as indigo derivaties are concerned, products similar to that of the invention were mentioned in the literature belonging to the matter.

A. Baeyer (Berliner Berichte, Vol. XII, 1879, pag. 1600) heated indigo, ferrous sulphate, oxide of potassium, water and pyrosulphate of potassium for 12 hours at 60° C. and obtained extremely small quantities of a product which shows resemblance with the indigo derivative obtained according to the new process. Baumann and Tiemann (Berliner Berichte, XIII, 1880, pag. 408) worked with indigo-white, potash lye and pyrosulphate of potassium under exclusion of air. They also obtained a body in very small output. Its cited properties correspond only partially with those of our indigo derivative. From an aqueous solution of the so called indigo-white sulphate of potassium of the last named authors indigo-white is precipitated immediately on addition of dilute hydrochloric acid. In contradistinction therewith, the indigo derivative of the present invention remains unaltered in aqueous solution on addition of dilute hydrochloric acid, is therefore more stable. Baumann and Tiemann described also a so called potassium indoxylsulfate, stating that this body furnishes indigo with ferric chloride only when being heated. From our new body, on the contrary, when being in aqueous solution, we obtain indigo in the cold on addition of ferric chloride.

According to both the mentioned publications there were obtained soluble indigo derivatives in an extremely small output and they were never isolated. According to the new process, however, we obtain in a quite normal output a valuable indigo derivative soluble in water, in solid and pure state. Moreover, our process is not only applicable on indigo, but also on other vat dyestuffs.

The German Patents 217477, 220173, 237262 and 239314 relate to stable indigo derivatives soluble in water, which are also designed for dyeing and printing purposes. They are all derivatives of dehydroindigo. The dyestuff is reobtained therefrom by reduction, whilst in the present invention the re-formation of the coloring matter takes place by an oxidation. The nature and use of the said dehydroindigo derivatives are consequently quite different from those of our new bodies and not comparable with them. The products obtained according to said patents have not yet any practical importance.

The invention is illustrated by the following examples:

Example 1.

220 gr. of dry dehydroindigo in form of powder is poured, at 0° C. and while carbonic acid being passed thereover, into a reaction mixture which was obtained by introducing 204 gr. of chlorosulphonic acid drop by drop into 900 gr. of chlorobenzene and 446 gr. of dimethylaniline at 0° C. The temperature is then allowed to rise to that of the operating room and brought afterwards in the course of about 2 hours gradually to 60° C. Thereupon, the mass is rendered alkaline by means of 500 gr. of soda lye of 30 per cent and distilled off by steam. The remaining liquid is filtered, then concentrated in vacuo to about 500 cubic centimeters and mixed with a solution of common salt, the sodium salt of the sulfoester being thus precipitated. The same is filtered off, pressed and dried.

In this example, the dimethylaniline may be replaced by diethylaniline.

Example 2.

To 72 parts of pyridine there are added slowly and while cooling 17.6 parts of chlorosulphonic acid and this mixture is then treated, under a $CO_2$ atmosphere, with 12.5 parts of dried dehydroindigo. The mass is then agitated for some time in the cold, then one-half to one hour at 50–60° C. When the reaction is achieved, the mass is diluted with water to the fivefold volume, gently heated, filtered hot and allowed to crystallize out. The compound separated therefrom is a pyridine salt which may be transformed into an alkali or other convenient salt.

Example 3.

The dry leuco derivative of $5:7:5':7'-$ tetrabromindigo is treated in analogous manner to that described in the first example, by using obviously equivalent proportions.

Example 4.

156 gr. of dry leuco-thioindigo are added to a reaction mass cooled down to 0° C., which was obtained by introducing 134.5 gr. of chlorosulphonic acid into a mixture of 280 gr. of dimethylaniline and of 500 gr. of chlorobenzene at 0° C. The further treatment is effected as in the example 1. At the end, the mass is rendered alkaline by means of soda lye and the dimethylaniline and chlorobenzene are distilled off by steam. From the filtered concentrated solution, the new body is allowed to crystallize out.

What we claim is:

1. The herein described process for the manufacture of stable derivatives of vat dyestuffs in solid form, soluble in water and especially valuable for dyeing and printing purposes, consisting in transforming the corresponding leuco-compound of a vat-dyestuff into an acid ester of a poly-basic acid.

2. The herein described process for the manufacture of stable derivatives of vat dyestuffs in solid form, soluble in water and especially valuable for dyeing and printing purposes, consisting in transforming the corresponding leuco-compound of a vat-dyestuff into an acid ester of a poly-basic acid and converting the said acid ester into an ester-salt.

3. The herein described process for the manufacture of stable derivatives of indigo-dyestuffs in solid form, soluble in water and especially valuable for dyeing and printing purposes, consisting in transforming the corresponding leuco-derivative of an indigo-dyestuff into an acid ester of a polybasic acid.

4. The herein described process for the manufacture of stable derivatives of indigo-dyestuffs in solid form, soluble in water and especially valuable for dyeing and printing purposes, consisting in transforming the corresponding leuco-derivative of an indigo-dyestuff into an acid ester of a polybasic acid and converting the said acid ester into an ester-salt.

5. The herein described process for the manufacture of stable derivatives of vat dyestuffs in solid form, soluble in water and especially valuable for dyeing and printing purposes, consisting in transforming the corresponding leuco-compound of a vat dyestuff into a sulfuric acid ester.

6. The herein described process for the manufacture of stable derivatives of vat dyestuffs in solid form, soluble in water and especially valuable for drying and printing purposes, consisting in transforming the corresponding leuco-compound of a vat dyestuff into a sulfuric acid ester and converting the said sulfuric acid ester into a sulfuric ester-salt.

7. As new products applicable for dyeing and printing textile materials and in general for pigmentation of various substrata, the herein described ester salts of leuco-derivatives of vat dyestuffs, which are soluble in water, show a great stability and give fast and uniform tints by their development on the substratum with the aid of a solution of an oxidizing agent.

8. As new products applicable for dyeing and printing textile materials and in general for pigmentation of various substrata, the herein described ester salts of leuco-derivatives of indigo-dyestuffs, which are soluble in water, show a great stability and give fast and uniform tints by their development on the substratum with the aid of a solution of an oxidizing agent.

9. As new products applicable for dyeing and printing textile materials and in general for pigmentation of various substrata, the herein described sulfuric ester salts of leuco-derivatives of vat dyestuffs, which are soluble in water, show a great stability and give fast and uniform tints by their development on the substratum with the aid of a solution of an oxidizing agent.

In witness whereof we have hereunto signed our name this 21st day of July, 1922, in the presence of two subscribing witnesses.

MARCEL BADER.
CHARLES SUNDER.

Witnesses:
AMAND RAME,
LUCIEN PICARD.